United States Patent
Rebollo Gomez et al.

(10) Patent No.: US 8,339,005 B2
(45) Date of Patent: Dec. 25, 2012

(54) ASSEMBLY AND METHOD FOR MOUNTING MAGNETS ON A STEEL SHEET ROTOR PACK

(75) Inventors: Adolfo Rebollo Gomez, Beasain (ES); Xabier Calvo Madariaga, Beasain (ES); Jose Antonio Estibariz Aristi, Beasain (ES); Gaizka Diaz Barrenetxea, Beasain (ES); Jon Vaquerizo Ayastuy, Beasain (ES); Nestor Churruca Gabilondo, Beasain (ES); Javier Sanchez Castaño, Beasain (ES); Marta Avis Plata, Beasain (ES); Julen Legorburu Aramburu, Beasain (ES)

(73) Assignee: Indar Electric S.L., Gipuzkoa (ES)

( * ) Notice: Subject to any disclaimer, the term of this patent is extended or adjusted under 35 U.S.C. 154(b) by 361 days.

(21) Appl. No.: 12/660,388

(22) Filed: Feb. 24, 2010

(65) Prior Publication Data

US 2011/0204739 A1    Aug. 25, 2011

(51) Int. Cl.
*H02K 1/30* (2006.01)
(52) U.S. Cl. .......... 310/156.18; 310/156.28; 310/156.31
(58) Field of Classification Search .............. 310/58, 310/59, 60 R, 61, 60 A, 156.08, 156.12–156.13, 310/156.15, 156.18–156.23, 156.28, 156.31, 310/156.32, 216.004, 216.015
See application file for complete search history.

(56) References Cited

U.S. PATENT DOCUMENTS

| | | | | |
|---|---|---|---|---|
| 4,445,062 A | * | 4/1984 | Glaser | 310/156.59 |
| 4,642,502 A | * | 2/1987 | Carpenter et al. | 310/156.12 |
| 5,818,138 A | * | 10/1998 | Hill | 310/152 |
| 6,081,052 A | | 6/2000 | Hosoe et al. | |
| 6,777,836 B2 | * | 8/2004 | Tong et al. | 310/65 |
| 7,285,890 B2 | * | 10/2007 | Jones et al. | 310/156.19 |
| 7,768,169 B2 | * | 8/2010 | Clark | 310/156.31 |
| 2010/0066191 A1 | | 3/2010 | Bahr et al. | |

FOREIGN PATENT DOCUMENTS

| | | |
|---|---|---|
| DE | 102007038668 A1 | 2/2009 |
| EP | 1860755 A2 | 11/2007 |
| JP | 57059462 A | 9/1982 |
| JP | 01138955 A * | 5/1989 |
| JP | 10336929 A | 12/1998 |
| JP | 2001025192 A | 1/2001 |
| JP | 2004040973 A * | 2/2004 |
| WO | WO2007025180 A1 | 3/2007 |
| WO | 2008110542 A1 | 9/2008 |

OTHER PUBLICATIONS

Extended European Search Report, Jul. 19, 2010, from European Patent Office in corresponding European Patent Application No. 10154590.3-1528.

* cited by examiner

*Primary Examiner* — Tran Nguyen
(74) *Attorney, Agent, or Firm* — Sughrue Mion, PLLC

(57) ABSTRACT

An assembly for mounting magnets on a steel sheet rotor pack, the assembly including a plurality of baseplates made of a magnetic material and fixed to the rotor pack, and a plurality of magnets being in turn fitted to each baseplate. In one embodiment, the baseplates are fixed to the rotor pack by means of inner locking bars housed in axial ducts provided inside said rotor pack. The baseplates are fitted to the inner locking bars by fixing means passing through longitudinal channels connecting the axial ducts and the outer surface of the rotor pack.

16 Claims, 3 Drawing Sheets

ASSEMBLY AND METHOD FOR MOUNTING MAGNETS ON A STEEL SHEET ROTOR PACK

FIELD OF INVENTION

The present invention relates to the technical field of electric machines and particularly to the field of electric machines excited by permanent magnets. Specifically, an object of the invention is a novel assembly for mounting magnets on the surface of a steel sheet rotor pack. One further object of the invention is a method for mounting magnets on the surface of a rotor pack.

BACKGROUND OF THE INVENTION

A permanent magnet electric machine is a synchronous machine whose rotor magnetic field is created by means of permanent magnets fitted to the rotor pack. Since the rotor pack rotates at high speeds when the machine is running, the fitting of the magnets must be strong enough to withstand the centrifugal forces, as well as the magnetic forces appearing between the magnets themselves. While rotor packs employed in electric machines without permanent magnets are formed by steel sheets joined together by means of pressure, this type of rotor pack is not employed in permanent magnet machines because of the difficulty of making screwed holes in the steel sheets for fitting the magnets. For this reason, rotor packs used in permanent magnet electric machines are usually formed by a single solid piece of steel to which the magnets are more easily fitted.

There are mainly two ways of fitting the magnets to the solid piece of steel: embedded or surface mounted. Embedding the magnets in the rotor pack is usually very complex and expensive, partly because the magnetic forces appearing between the magnets make the embedding operation extremely difficult. On the other hand, while fitting the magnets on the surface of the rotor pack is easier to do, the magnetic and centrifugal forces appearing within the magnets when the machine is in use are often too strong, this solution being thus limited to slow machines.

Additionally, generally speaking all pieces forming the rotor must be placed accurately in their location in the rotor pack, since an inaccurate fitting of the pieces may cause the machine to be noisy. Specifically, an inadequate position of the magnets may cause a drop in the performance of the machine, as well as high levels of noise and vibration.

On the other hand, rare earth permanent magnets may suffer demagnetization if overheated, some consequences being a drop in performance due to an increase in air gap surface losses, a cooling system for the rotor, such as cooling ducts, being thus necessary.

SUMMARY OF THE INVENTION

In view of all of the above, a need still exists in the art to develop an assembly for fixing magnets to a steel sheet rotor pack in a permanent magnet electric machine. The present invention describes an assembly employing a baseplate which is easily manufactured employing the leftovers of the steel sheets previously used to manufacture the stator. In fact, also the rotor pack may be manufactured employing the leftovers of the sheets used to make the stator, this solution thus being more economic, less time-consuming and requiring a lower amount of labour.

A first aspect of the invention discloses an assembly for mounting magnets on a steel sheet rotor pack which comprises a plurality of baseplates made of a magnetic material and fixed to the rotor pack, a plurality of magnets being in turn fitted to each baseplate. The baseplates may have any shape suitable for covering the outer surface of the rotor pack, although preferably they are curved rectangular sheets which, when assembled, form a cylinder covering the outer surface of the rotor pack.

According to a preferred embodiment of the invention, the baseplates are fixed to the rotor pack by means of inner locking bars housed in axial ducts provided inside said rotor pack. Inner locking bars are elongated metal bars having a shape suitable for fitting inside the axial ducts. The baseplates are thus fitted to the locking bars by fixing means passing through longitudinal channels connecting the axial ducts and the outer surface of the rotor pack. The axial ducts housing the inner locking bars may be dedicated, in which case they may have a size equal to the cross-section of the inner locking bars. However, it is also possible to employ for this purpose the axial cooling ducts frequently provided in steel sheet rotor packs. In that case, the axial ducts are larger than the cross-section of the inner locking bars, thus allowing air to flow through said axial ducts.

In the present document, the term "fastener" makes reference to any type of elongated part commonly employed for fixing two pieces together, such as bolts, screws, studs, spikes, mandrels or the like. There are mainly two ways of fixing the baseplates to the rotor pack using the fixing means:

According to a preferred embodiment of the invention, the fixing means comprise fasteners screwed to the baseplates and to the inner locking bars.

According to another preferred embodiment of the invention, the fixing means comprise outer locking bars having a shape which overlaps over the lateral sides of the baseplates and which are fitted to the inner locking bars by means of fasteners screwed to the inner and the outer locking bars. This configuration allows holding the baseplates into place without employing screws or the like for fixing the baseplates to the outer locking bars, but only by means of the complementary overlapping shape of the outer locking bars. Preferably, the locking bars are made of a magnetic material, therefore forming part of the electric circuit of the electric machine.

On the other hand, there are mainly three ways of fitting the magnets to the baseplates:

According to a preferred embodiment of the invention, the magnets are fitted to the baseplate by a bandage wound around the magnets. The bandage, preferably made of glass fiber, may have any number of turns around the rotor pack for ensuring a correct fitting of the magnets.

According to another preferred embodiment of the invention, the magnets are directly screwed to the baseplate.

According to yet another preferred embodiment of the invention, the magnets are glued to the baseplate.

According to another preferred embodiment of the invention, the inner surface of each baseplate is formed by planes having longitudinal edges for positioning the baseplates tangentially on respective planes and longitudinal edges formed on the outer surface of the rotor pack. The baseplates therefore do not fit into place unless they are correctly positioned on the surface of the rotor pack, this positioning system preventing potential noise and/or vibration problems arising when the machine is running.

Preferably, the rotor pack further comprises radial ducts formed between pairs of sheets, these radial ducts allowing air to flow outwards from the inside of the rotor pack.

According to another preferred embodiment, the rotor pack also comprises pairs of sheets which protrude from the outer surface of the rotor pack, these pairs of protruding sheets being positioned such that they aid in positioning the baseplates axially. The rotor pack may also comprise protruding sheets positioned such that they aid in guiding the bandage over the magnets.

In order to make the handling of the baseplates easier when mounting them to the rotor pack, the baseplates comprise lateral grooves, holes or drills which allow for grasping.

Finally, the invention is further directed to a permanent magnet electric machine comprising an assembly of the type described above.

A second aspect of the invention discloses a method for mounting magnets on a steel sheet rotor pack comprising the following steps:

1) Fitting a plurality of demagnetized magnets to a baseplate.
2) Magnetizing said magnets.
3) Laying the baseplate on the outer surface of the rotor pack.
4) Fixing the baseplate to the rotor pack by means of inner locking bars located inside axial ducts provided in the rotor pack.

An important drawback when fitting magnets to a rotor pack according to the prior art is caused by the magnetic forces appearing between the magnets. In short, the magnets are usually firstly magnetized and then fitted to the rotor pack individually. The reason is the enormous amount of energy that would be required to magnetize all the magnets at the same time once they are all fitted to the rotor pack. Therefore, as the number of magnets fitted to the rotor increases, so do the magnetic forces therebetween, and accordingly the more difficult it is to position and fit subsequent magnets.

Conversely, the present invention allows for fixing a small number of demagnetized magnets to a baseplate, this operation being easy due to the lack of magnetic forces. Then, both the magnets and the baseplate are magnetized, and subsequently the baseplate fixed to the rotor pack. These steps are repeated until all the baseplates are fixed to the rotor pack. This process significantly reduces the number of operations required to mount all the magnets to the rotor pack, thus saving labour time and costs. Also, fitting the magnets to the baseplate while still demagnetized is safer than the prior art method of mounting them under the influence of strong magnetic forces.

BRIEF DESCRIPTION OF THE DRAWINGS

The teachings of the present invention will be readily understood from the following detailed description when considered in conjunction with the accompanying drawings, in which.

To facilitate understanding of the invention, identical reference numerals have been used, when appropriate, to designate the same or similar elements that are common to the figures.

DESCRIPTION OF PREFERRED EMBODIMENTS

A detailed description of a preferred embodiment of the present invention will be made, making references to the aforementioned figures.

Figure 1:
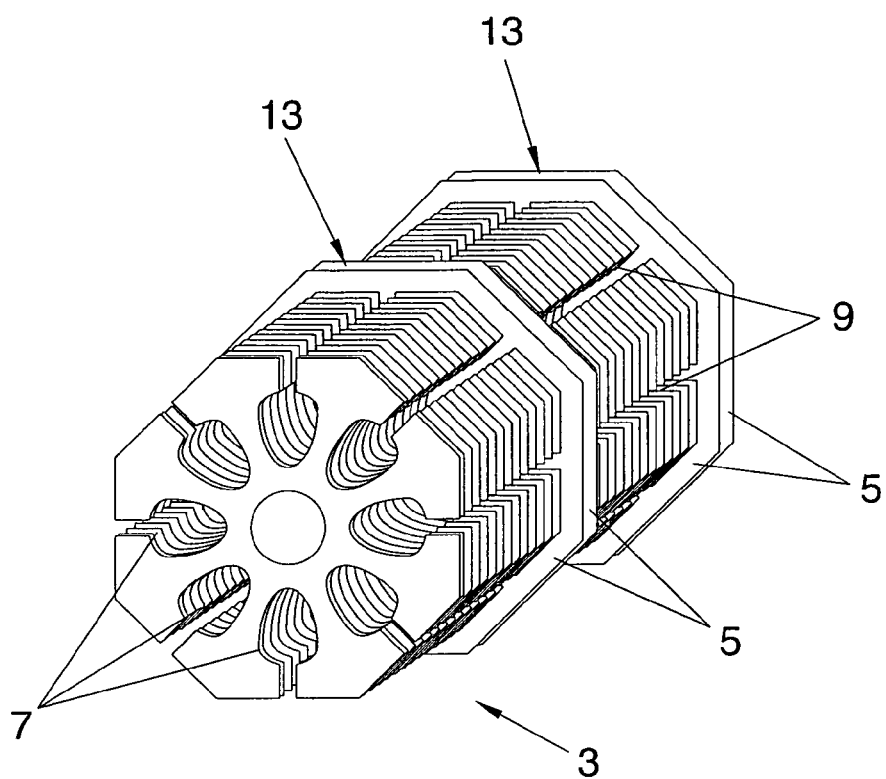
FIG. 1 shows a perspective view of a steel sheet rotor pack according to a preferred embodiment of the present invention.

FIG. 1 shows a rotor pack (3) according to an embodiment of the invention. The rotor pack (3) is formed by a plurality of laminated steel sheets fixed to a metallic shaft (12) (not shown in FIG. 1). Additionally, the outer surface of the rotor pack (3) is formed by a number of longitudinal planes having edges for positioning the baseplates (2) tangentially. Also, this rotor pack (3) comprises a number of steel sheets (5) protruding from its outer surface and having radial ducts (13) therebetween which allow for the cooling of the rotor pack (3). Additionally, these protruding steel sheets (5) serve as a guide for positioning the baseplates (2) axially and, if a bandage (11) for fixing magnets (4) is employed, they also serve for guiding the bandage (11) around the magnets (4). The rotor pack (3) of the invention further shows longitudinal channels (9) which allow for fixing baseplates (2) thereto according to the description below.

Figure 2:
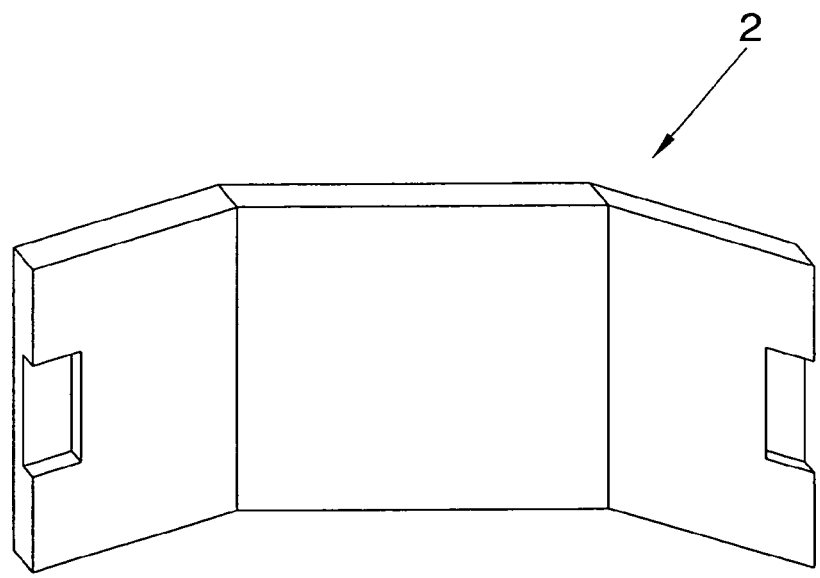
FIG. 2 shows a perspective view of a baseplate having magnets fitted thereto according to a preferred embodiment of the present invention.

FIG. 2 shows a perspective view of a baseplate (2) according to the invention. The baseplate (2) is made of a magnetic material, and its inner surface is formed by planes and edges complementary with those of the rotor pack (3) of FIG. 1, such that the baseplates (2) fit on the outer surface of the rotor pack (3) in certain positions. It is evident from these drawings that the baseplates (2) only fit on the external surface of the rotor pack (3) in certain specific positions, thus facilitating the step of mounting the baseplates (2) fitted with magnetized magnets (4). FIG. 2 also shows a couple of lateral grooves provided in the inner surface of the baseplate (2) which make handling easier.

Figure 3:
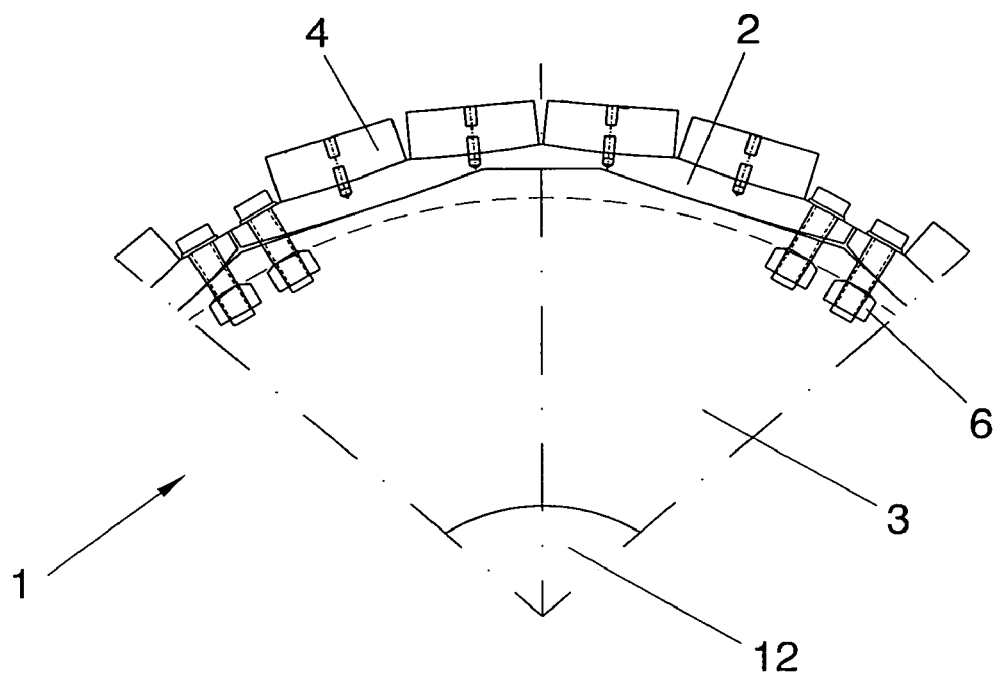
FIG. 3 shows a transversal cross-section view of a preferred embodiment of the assembly of the invention.

Once laid in position, each baseplate (2) is fixed to respective inner locking bars (6) located inside axial ducts (7) provided within the rotor pack (3). Indeed, FIG. 3 shows a transversal cross-section of an embodiment of a mounting assembly (1) according to the invention where the baseplates (2) are fixed to the rotor pack (3) by means of fasteners directly screwed to the baseplates (2), passing through the longitudinal channels (9) of the rotor pack (3), and finally screwed to the inner locking bars (6). The magnets (4) of FIG. 3 are also fitted to the baseplates (2) by means of fasteners.

Figure 4:
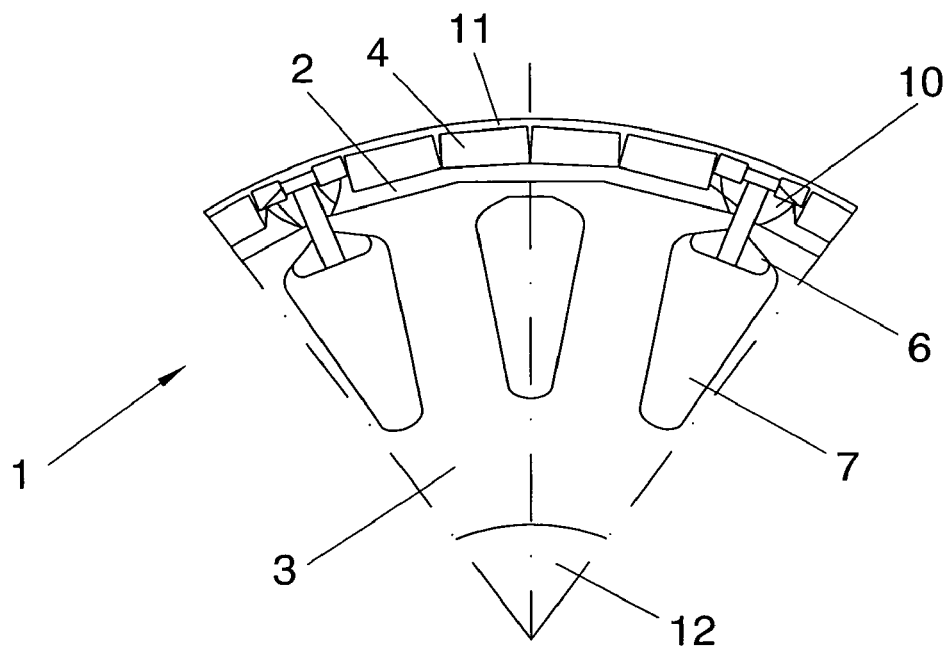
FIG. 4 shows a transversal cross-section view of another preferred embodiment of the assembly of the invention.

On the other hand, FIG. 4 shows another embodiment of the mounting assembly (1) of the invention where the baseplates (2) are fixed to the rotor pack (3) by means of an outer locking bar (10) having a shape overlapping the lateral sides of the baseplates, a dovetail shape in this example, the shorter side of the inner locking bar (10) being adjacent to the outer surface of the rotor pack (3). Thus, when screwed by means of fasteners to the inner locking bars (6) located in the axial ducts (7), the dovetail shaped outer locking bars (10) hold the baseplates (2) in position. The figure also discloses the magnets (4) being fitted to the baseplate (2) by means of a bandage (11) rolled around them. The axial ducts (7) shown in this figure have a size larger than the cross-section of the inner locking bars (6), thus allowing space for cooling air to flow through.

Figure 5:
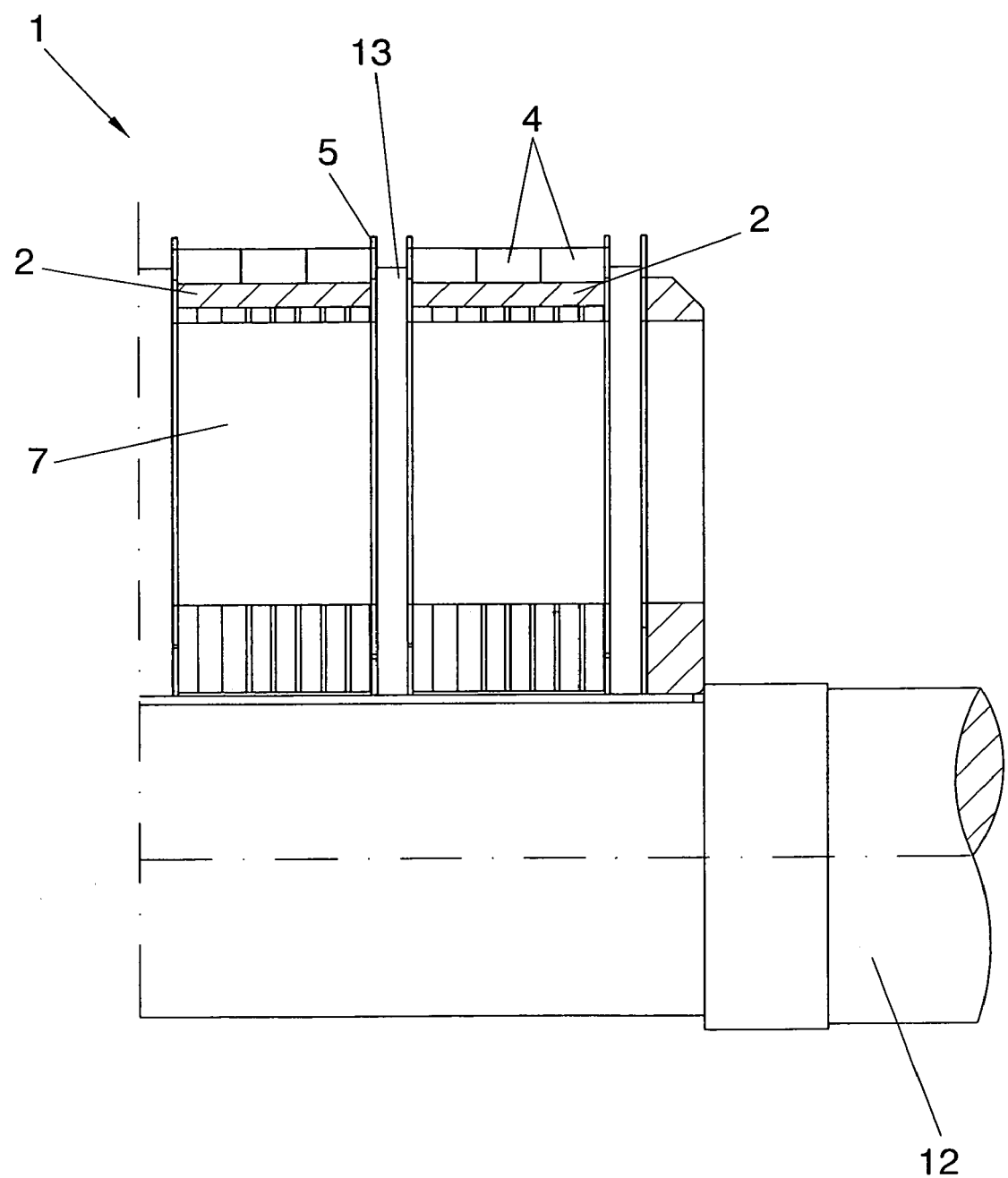
FIG. 5 shows an axial cross-section of yet another preferred embodiment of the invention.

Finally, FIG. 5 shows an axial cross-section of an assembly (1) according to the invention where the radial cooling ducts (13) can be seen. The radial cooling ducts (13) in this figure are formed by two steel sheets (5) separated by a distance which allows air to flow out of the rotor pack (3). The steel sheets (5), as also disclosed earlier in the present document, may also be employed as a guide for positioning the baseplates (2) tangentially on the outer surface of the rotor pack (3).

Although various embodiments that incorporate the teachings of the present invention have been shown and described in detail herein, those skilled in the art can readily devise many other varied embodiments that still incorporate these teachings.

What is claimed is:

1. An assembly for mounting magnets on a steel sheet rotor pack, comprising a plurality of baseplates made of a magnetic material and fixed to the rotor pack, a plurality of magnets being in turn fitted to each baseplate, wherein the baseplates are fixed to the rotor pack by means of inner locking bars housed in axial ducts provided inside said rotor pack, the baseplates being fitted to the inner locking bars by fixing means passing through longitudinal channels connecting the axial ducts and the outer surface of the rotor pack.

2. Assembly according to claim 1, wherein the axial ducts are larger than the cross-section of the inner locking bars, such that air can flow through them.

3. Assembly according to claim 1, wherein the locking bars are made a magnetic material.

4. Assembly according to claim 1, wherein the fixing means comprise fasteners screwed to the baseplates and to the inner locking bars.

5. Assembly according to claim 1, wherein the fixing means comprise outer locking bars having a shape overlapping the lateral sides of the baseplates and fitted to the inner locking bars by means of fasteners screwed to the outer locking bars and to the inner locking bars.

6. Assembly according to claim 5, wherein the outer locking bars are dovetail shaped.

7. Assembly according to claim 5, wherein the locking bars are made a magnetic material.

8. Assembly according to claim 1, wherein the magnets are fitted to the baseplate by a bandage wound around the magnets.

9. Assembly according to claim 1, wherein the magnets are screwed to the baseplates.

10. Assembly according to claim 1, wherein the magnets are glued to the baseplates.

11. Assembly according to claim 1, wherein the inner surface of each baseplate is formed by planes having longitudinal edges for positioning the baseplates tangentially on respective planes and longitudinal edges formed on the outer surface of the rotor pack.

12. Assembly according to claim 1, wherein the rotor pack further comprises radial ducts formed between pairs of sheets.

13. Assembly according to claim 1, wherein the rotor pack further comprises sheets protruding from the outer surface of the rotor pack and serving as a guide for positioning the baseplates axially.

14. Assembly according to claim 8, wherein the rotor pack further comprises sheets protruding from the outer surface of the rotor pack and serving as a guide for the bandage.

15. Assembly according to claim 1, wherein each baseplate comprises lateral grooves, holes or drills for easing handling operations.

16. Permanent magnet electric machine comprising an assembly according to claim 1.

* * * * *